Figure 1:
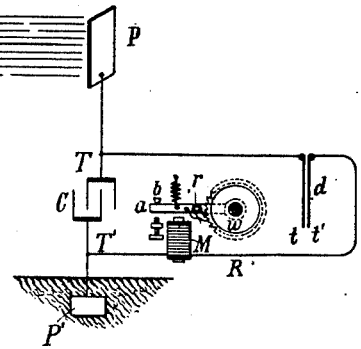

455-619　　AU 233　　EX
FIP8106　　OR　　685,958

No. 685,958.　　　　　　　　　　　　　　　　Patented Nov. 5, 1901.
N. TESLA.
METHOD OF UTILIZING RADIANT ENERGY.
(Application filed Mar. 21, 1901.)

(No Model.)

*Electric stepping motor energized by corpuscular energy from sun*

Witnesses:　　　　　　　　　　　　　　　Nikola Tesla, Inventor

UNITED STATES PATENT OFFICE.

NIKOLA TESLA, OF NEW YORK, N. Y.

METHOD OF UTILIZING RADIANT ENERGY.

SPECIFICATION forming part of Letters Patent No. 685,958, dated November 5, 1901.

Application filed March 21, 1901. Serial No. 52,154. (No model.)

*To all whom it may concern:*

Be it known that I, NIKOLA TESLA, a citizen of the United States, residing at the borough of Manhattan, in the city, county, and State of New York, have invented certain new and useful Improvements in Methods of Utilizing Radiant Energy, of which the following is a specification, reference being had to the drawings accompanying and forming a part of the same.

It is well known that certain radiations—such as those of ultra-violet light, cathodic, Roentgen rays, or the like—possess the property of charging and discharging conductors of electricity, the discharge being particularly noticeable when the conductor upon which the rays impinge is negatively electrified. These radiations are generally considered to be ether vibrations of extremely small wave lengths, and in explanation of the phenomena noted it has been assumed by some authorities that they ionize or render conducting the atmosphere through which they are propagated. My own experiments and observations, however, lead me to conclusions more in accord with the theory heretofore advanced by me that sources of such radiant energy throw off with great velocity minute particles of matter which are strongly electrified, and therefore capable of charging an electrical conductor, or even if not so may at any rate discharge an electrified conductor either by carrying off bodily its charge or otherwise.

My present application is based upon a discovery which I have made that when rays or radiations of the above kind are permitted to fall upon an insulated conducting body connected to one of the terminals of a condenser, while the other terminal of the same is made by independent means to receive or to carry away electricity, a current flows into the condenser so long as the insulated body is exposed to the rays, and under the conditions hereinafter specified an indefinite accumulation of electrical energy in the condenser takes place. This energy after a suitable time interval, during which the rays are allowed to act, may manifest itself in a powerful discharge, which may be utilized for the operation or control of mechanical or electrical devices or rendered useful in many other ways.

In applying my discovery I provide a condenser, preferably of considerable electrostatic capacity, and connect one of its terminals to an insulated metal plate or other conducting body exposed to the rays or streams of radiant matter. It is very important, particularly in view of the fact that electrical energy is generally supplied at a very slow rate to the condenser, to construct the same with the greatest care. I use by preference the best quality of mica as dielectric, taking every possible precaution in insulating the armatures, so that the instrument may withstand great electrical pressures without leaking and may leave no perceptible electrification when discharging instantaneously. In practice I have found that the best results are obtained with condensers treated in the manner described in a patent granted to me February 23, 1897, No. 577,671. Obviously the above precautions should be the more rigorously observed the slower the rate of charging and the smaller the time interval during which the energy is allowed to accumulate in the condenser. The insulated plate or conducting body should present as large a surface as practicable to the rays or streams of matter, I having ascertained that the amount of energy conveyed to it per unit of time is under otherwise identical conditions proportionate to the area exposed, or nearly so. Furthermore, the surface should be clean and preferably highly polished or amalgamated. The second terminal or armature of the condenser may be connected to one of the poles of a battery or other source of electricity or to any conducting body or object whatever of such properties or so conditioned that by its means electricity of the required sign will be supplied to the terminal. A simple way of supplying positive or negative electricity to the terminal is to connect the same either to an insulated conductor, supported at some height in the atmosphere, or to a grounded conductor, the former, as is well known, furnishing positive and the latter negative electricity. As the rays or supposed streams of matter generally convey a positive charge to the first condenser-terminal, which is connected to the plate or conductor above mentioned, I usually connect the second terminal of the condenser to the ground, this being the most convenient way of obtaining negative electricity, dispensing with the necessity of providing an artificial source. In order to utilize for any useful purpose the energy accumulated in the condenser, I furthermore connect to the terminals of the same a circuit including an instrument or apparatus which it is desired to operate and another instrument or device for alternately closing and opening the circuit. This latter may be any form of circuit-controller, with fixed or movable parts or electrodes, which may be actuated either by the stored energy or by independent means.

The rays or radiations which are to be utilized for the operation of the apparatus above described in general terms may be derived from a natural source, as the sun, or may be artificially produced by such means, for example, as an arc-lamp, a Roentgen tube, and the like, and they may be employed for a great variety of useful purposes.

My discovery will be more fully understood from the following detailed description and annexed drawings, to which reference is now made, and in which—

Figure 2:
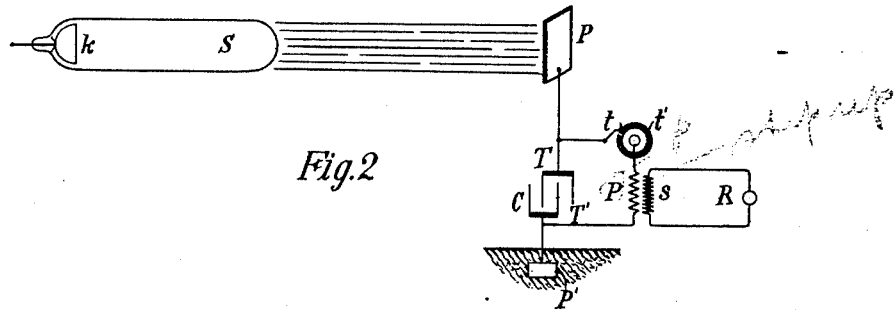

Figure 1 is a diagram showing typical forms of the devices or elements as arranged and connected in applying the method for the operation of a mechanical contrivance or instrument solely by the energy stored; and Fig. 2 is a diagrammatical representation of a modified arrangement suitable for special purposes, with a circuit-controller actuated by independent means.

Referring to Fig. 1, C is the condenser, P the insulated plate or conducting body, which is exposed to the rays, and P' another plate or conductor, all being joined in series, as shown. The terminals T T' of the condenser are also connected to a circuit including a receiver R, which is to be operated, and a circuit-controlling device $d$, which in this case is composed of two very thin conducting-plates $t\ t'$, placed in close proximity and very mobile, either by reason of extreme flexibility or owing to the character of their support. To improve their action, they should be inclosed in a receptacle from which the air may be exhausted. The receiver R is shown as consisting of an electromagnet M, a movable armature $a$, a retractile spring $b$, and a ratchet-wheel $w$, provided with a spring-pawl $r$, which is pivoted to armature $a$, as illustrated. The apparatus being arranged as shown, it will be found that when the radiations of the sun or of any other source capable of producing the effects before described fall upon the plate P an accumulation of electrical energy in the condenser C will result. This phenomenon, I believe, is best explained as follows: The sun as well as other sources of radiant energy throw off minute particles of matter positively electrified, which, impinging upon the plate P, communicate an electrical charge to the same. The opposite terminal of the condenser being connected to the ground, which may be considered as a vast reservoir of negative electricity, a feeble current flows continuously into the condenser, and inasmuch as these supposed particles are of an inconceivably small radius or curvature, and consequently charged to a relatively very high potential, this charging of the condenser may continue, as I have found in practice, almost indefinitely, even to the point of rupturing the dielectric. Obviously whatever circuit-controller be employed it should operate to close the circuit in which it is included when the potential in the condenser has reached the desired magnitude. Thus in Fig. 2 when the electrical pressure at the terminals T T' rises to a certain predetermined value the plates $t\ t'$, attracting each other, close the circuit connected to the terminals. This permits a flow of current which energizes the magnet M, causing it to draw down the armature $a$ and impart a partial rotation to the ratchet-wheel $w$. As the current ceases the armature is retracted by the spring $b$ without, however, moving the wheel $w$. With the stoppage of the current the plates $t\ t'$ cease to be attracted and separate, thus restoring the circuit to its original condition.

Many useful applications of this method of utilizing the radiations emanating from the sun or other source and many ways of carrying out the same will at once suggest themselves from the above description. By way of illustration a modified arrangement is shown in Fig. 2, in which the source S of radiant energy is a special form of Roentgen tube devised by me having but one terminal $k$, generally of aluminium, in the form of half a sphere with a plain polished surface on the front side, from which the streams are thrown off. It may be excited by attaching it to one of the terminals of any generator of sufficiently-high electromotive force; but whatever apparatus be used it is important that the tube be exhausted to a high degree, as otherwise it might prove entirely ineffective. The working or discharge circuit connected to the terminals T T' of the condenser includes in this case the primary $p$ of a transformer and a circuit-controller comprising a fixed terminal or brush $t$ and a movable terminal $t'$ in the shape of a wheel with conducting and insulating segments which may be rotated at an arbitrary speed by any suitable means. In inductive relation to the primary wire or coil $p$ is a secondary $s$, usually of a much greater number of turns, to the ends of which is connected a receiver R. The terminals of the condenser being connected as indicated, one to an insulated plate P and the other to a grounded plate P', when the tube S is excited rays or streams of matter are emitted from the same, which convey a positive charge to the plate P and condenser-terminal T, while terminal T' is continuously receiving negative electricity from the plate P'. This, as before explained, results in an accumulation of electrical energy in the condenser, which goes on as long as the circuit including the primary $p$ is interrupted. Whenever the circuit is closed, owing to the rotation of the terminal $t'$, the stored energy is discharged through the primary $p$, this giving rise in the secondary $s$ to induced currents which operate the receiver R.

It is clear from what has been stated above that if the terminal $T'$ is connected to a plate supplying positive instead of negative electricity the rays should convey negative electricity to plate P. The source S may be any form of Roentgen or Lenard tube; but it is obvious from the theory of action that in order to be very effective the electrical impulses exciting it should be wholly or at least preponderatingly of one sign. If ordinary symmetrical alternating currents are employed, provision should be made for allowing the rays to fall upon the plate P only during those periods when they are productive of the desired result. Evidently if the radiations of the source be stopped or intercepted or their intensity varied in any manner, as by periodically interrupting or rythmically varying the current exciting the source, there will be corresponding changes in the action upon the receiver R, and thus signals may be transmitted and many other useful effects produced. Furthermore, it will be understood that any form of circuit-closer which will respond to or be set in operation when a predetermined amount of energy is stored in the condenser may be used in lieu of the device specifically described with reference to Fig. 1, and also that the special details of construction and arrangement of the several parts of the apparatus may be very greatly varied without departure from the invention.

Having described my invention, what I claim is—

1. The method of utilizing radiant energy, which consists in charging one of the armatures of a condenser by rays or radiations, and the other armature by independent means, and discharging the condenser through a suitable receiver, as set forth.

2. The method of utilizing radiant energy, which consists in simultaneously charging a condenser by means of rays or radiations and an independent source of electrical energy, and discharging the condenser through a suitable receiver, as set forth.

3. The method of utilizing radiant energy, which consists in charging one of the armatures of a condenser by rays or radiations, and the other by independent means, controlling the action or effect of said rays or radiations and discharging the condenser through a suitable receiver, as set forth.

4. The method of utilizing radiant energy, which consists in charging one of the armatures of a condenser by rays or radiations and the other by independent means, varying the intensity of the said rays or radiations and periodically discharging the condenser through a suitable receiver, as set forth.

5. The method of utilizing radiant energy, which consists in directing upon an elevated conductor, connected to one of the armatures of a condenser, rays or radiations capable of positively electrifying the same, carrying off electricity from the other armature by connecting the same with the ground, and discharging the accumulated energy through a suitable receiver, as set forth.

6. The method of utilizing radiant energy, which consists in charging one of the armatures of a condenser by rays or radiations, and the other by independent means, and effecting by the automatic discharge of the accumulated energy the operation or control of a suitable receiver, as set forth.

NIKOLA TESLA.

Witnesses:
M. LAWSON DYER,
RICHARD DONOVAN.